United States Patent [19]

Lopez

[11] Patent Number: 4,795,040
[45] Date of Patent: Jan. 3, 1989

[54] TOTE BOX CARRIER

[75] Inventor: David A. Lopez, Newark, Del.

[73] Assignee: Metal Masters Foodservice Equipment Co., Smyrna, Del.

[21] Appl. No.: 137,183

[22] Filed: Dec. 23, 1987

[51] Int. Cl.4 ................................. A47F 3/14
[52] U.S. Cl. .................... 211/126; 280/79.3
[58] Field of Search ........ 211/126, 4, 90, 71, 211/150, 153, 133, 134; 280/79.3

[56] References Cited

U.S. PATENT DOCUMENTS

| | | | |
|---|---|---|---|
| 1,708,588 | 4/1929 | Proctor | 211/191 X |
| 2,187,354 | 1/1940 | Mac Manus | 280/79.3 X |
| 2,926,022 | 2/1960 | Nau et al. | 280/79.3 |
| 2,959,298 | 11/1960 | Pope | 211/126 |
| 3,721,349 | 3/1973 | Jaffee et al. | 280/79.3 X |
| 4,588,096 | 5/1986 | Story et al. | 280/79.3 X |

Primary Examiner—Reinaldo P. Machado
Assistant Examiner—Sarah A. Lechok Eley
Attorney, Agent, or Firm—Connolly and Hutz

[57] ABSTRACT

A tote box carrier includes cooperating pairs of spaced apart side rails which function to guide and support tote boxes associated with the carrier. Clip stop elements connected to the side rails function to prevent inadvertent removal of the tote boxes from the carrier. The clip stop elements also have an inoperative position which enables the tote boxes to be removed from the carrier.

5 Claims, 1 Drawing Sheet

U.S. Patent    Jan. 3, 1989    4,795,040
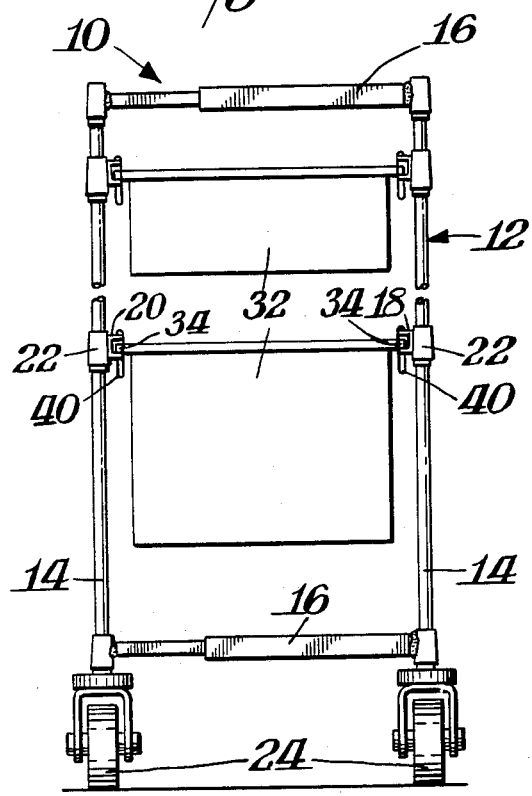
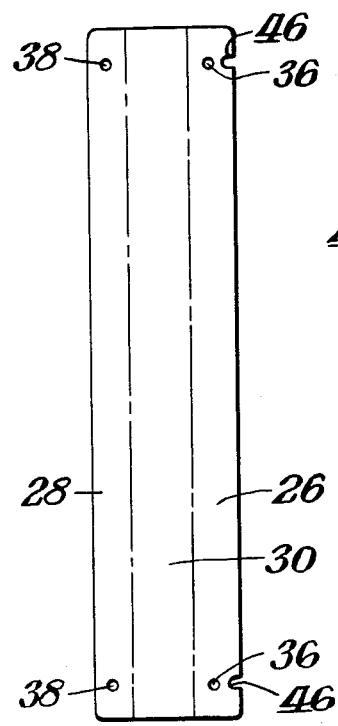
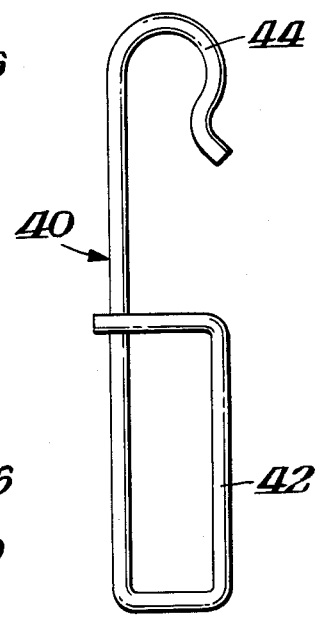
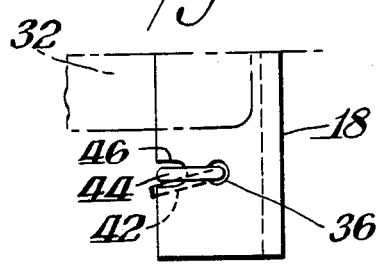
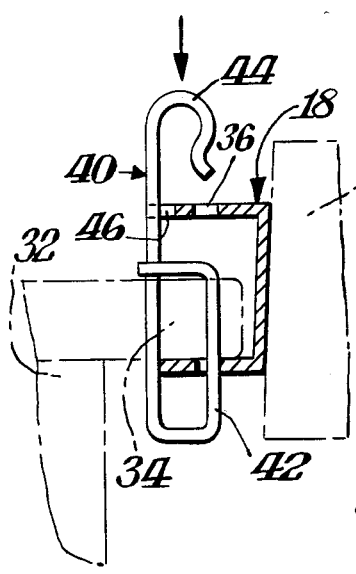
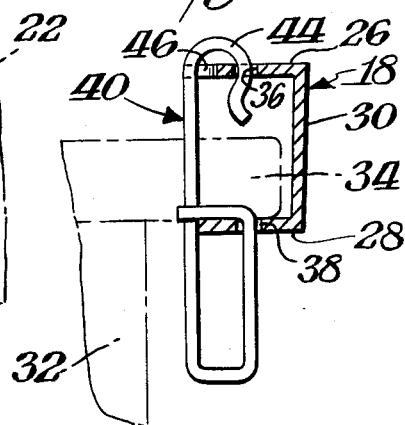
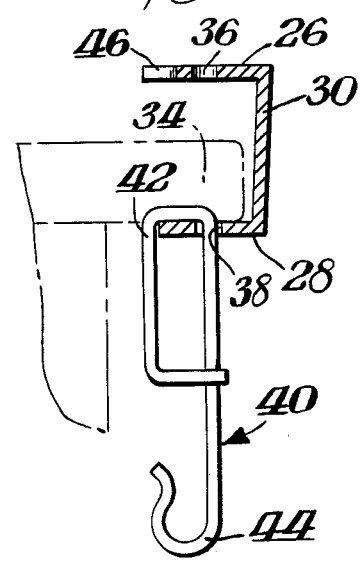

TOTE BOX CARRIER

BACKGROUND OF THE INVENTION

The present invention relates to a tote box carrier, and more particularly to a carrier with clip stop elements that prevent inadvertent separation of the tote boxes from the carrier.

Prior to the present invention, tote box carriers of one type or another have been proposed but inadvertent separation of the tote boxes from the carrier remains a persistent problem. While solutions to this problem including jerry-built modification have been used to prevent the boxes from inadvertently sliding out of the carrier, these solutions are often characterized by their overall complexity and poor performance.

SUMMARY OF THE INVENTION

Accordingly, it is an object of this invention to provide a tote box carrier which avoids the problems of the prior art by including a simple but highly effective mechanism for preventing inadvertent separation of the tote boxes from the carrier.

In accordance with the present invention, a tote box carrier comprises a framework and at least one pair of spaced apart side rails, each a mirror image duplicate of the other. The side rails are connected to the framework and each rail has a C-shaped cross-section including upper and lower horizontally disposed surfaces with an outer portion interconnecting those surfaces. A tote box is supported by the opposed side rails and such box has outwardly extending side flanges resting upon the lower surfaces of the side rails. A pair of generally aligned openings is provided in the upper and lower surfaces of each side rail adjacent each end thereof, and a clip stop element is associated with each pair of generally aligned openings. Each clip stop element has a closed loop-shaped end extending through the opening in the lower surface of the side rail for attaching the element to the side rail. Each clip stop element also includes an open hook-shaped end releasably extending through the opening in the upper surface of the side rail in blocking engagement with the side flanges of the tote box when removal prevention of the tote box is desired. With each open hook-shaped end being removable from the opening in the upper surface of the side rail, the clip stop is free to swing about its closed loop-shaped end to position out of contact with the side flanges of the tote box when removal thereof is desired.

Each clip stop element is preferably made from spring type wire. Also, the closed loop-shaped end of the clip stop element has a rectangular configuration.

The upper horizontally disposed surface of each side rail includes a notch adjacent each opening therein constructed and arranged to receive the clip stop element when the hook-shaped end thereof is extended through the opening in the upper surface of the side rail. Preferably each clip stop element is constructed and arranged to produce a snap fit between the open hook-shaped end thereof and the upper surface of the side rail.

BRIEF DESCRIPTION OF THE DRAWING

Novel features and advantages of the present invention in addition to those mentioned above will be apparent to those of ordinary skill in the art from a reading of the following detailed description in conjunction with the accompanying drawing wherein:

FIG. 1 is a front elevational view of a tote box carrier according to the present invention;

FIG. 2 is a pattern layout of one of the side rails of the tote box carrier shown in FIG. 1;

FIG. 3 is a front elevational view of a clip stop element of the tote box carrier shown in FIG. 1;

FIG. 4 is a cross-sectional view illustrating the clip stop element and its associated side rail with the element being manipulated into its tote blocking position which prevents separation of the tote box from the carrier;

FIG. 5 is a view similar to FIG. 4 illustrating the clip stop element in its tote blocking position;

FIG. 6 is a partial top plan view of the clip stop element and its associated side rail with the clip in its tote blocking position; and FIG. 7 is a cross-sectional view similar to FIGS. 4 and 5 but illustrating the clip stop element in its non-blocking position which allows removal of the tote box from the carrier.

DETAILED DESCRIPTION OF THE INVENTION

Referring in more particularity to the drawing, FIG. 1 illustrates a tote box carrier 10 comprising a framework 12 that includes uprights 14 and interconnecting cross bars 16. Pairs of spaced apart side rails 18, 20 are connected to the framework 12 by collars or sockets 22 releasably secured to the uprights 14 of the framework. Connection of the collars to the such as described in U.S. Pat. Nos. 3,424,111 and 4,318,352, for example. Castors 24 are connected to the base of uprights 14 to provide mobility to tote box carrier 10.

Side rails 18, 20 are mirror image duplicates of one another and each has a generally C-shaped cross-section that includes upper and lower horizontally disposed surfaces 26, and 28, respectively. These surfaces are interconnected by an outer surface portion 30 which in turn is connected to the collars or sockets 22. Since the collars 22 are slightly conical in configuration, the outer portion 30 of side rail 18 is slightly angled to insure good surface contact with the collar.

Tote boxes 32 are associated with the pairs of spaced apart side rails 18, 20. Each tote box has outwardly extending side flanges 34, which rests upon the lower surface 28 of each side rail, as shown in FIGS. 1 and 4, for example. In use, the side rails function to guide and support tote boxes 32 onto and away from the framework 12 of the tote box carrier 10.

Openings are provided in the upper and lower surfaces 26, 28 of each side rail adjacent each end thereof. Specifically, an opening 36 is positioned in upper surface 26 while a generally aligned opening 38 is positioned in lower surface 28. The relationship of these openings is shown in the various figures of the drawing.

A clip stop element 40 is associated with each pair of generally aligned openings 36, 38. Each clip stop element 40 has a closed loop-shaped end 42 which extends through the opening 38 in the lower surface 28 of the side rails. Also, each clip stop element has an open hook-shaped end 44 releasably extending through opening 36 in the upper surface 26 of the side rails. As explained more fully below, the clip stop elements function to prevent inadvertent removal or separation of the tote boxes from the carrier while allowing removal thereof when desired.

The upper surface 36 of each guide rail also includes a notch 46 adjacent the opening 36 therein. As shown best in FIGS. 5 and 6, notch 46 receives the clip stop element when the open hook-shaped end thereof is extended through opening 36 in upper surface 26 of the side rails. Preferably the relationship of the open hook-shaped end 44 together with opening 36 and notch 46 is such that a positive snap fit results when the clip stop element is urged into the opening 36 and notch 46 of the upper surface.

The clip stop element is preferably made from spring type wire although other materials are equally suitable. Also, the closed loop-shaped end 42 of the clip stop element 40 preferably has a rectangular configuration, as illustrated in the drawing In its inoperative or non-blocking position, one leg of the rectangle simply rests upon the lower surface 28 of the side rail, as shown in FIG. 7.

The clip stop elements of the present invention have two positions relative to the side rails 18, 20 to which the elements are attached. In the operative or tote blocking position the open hook-shaped end 44 of the element 40 extends into and through the opening 36 in the upper surface 26 of the side rail. The clip stop element extends into notch 46 and in this position removal or inadvertent separation of the box 32 from carrier 10 is prevented since the stop elements interfere with the side flanges 34 of the tote boxes. However, when removal of a box is desired the clip stop elements 40 at the front or rear of each opposed pair of side rails are urged upwardly until the open hook-shaped end 44 of each element clears its respective opening 36 in the upper rail surface 26. The clip stop elements are then allowed to swing to an inoperative non-blocking position where the elements no longer effectively interfere with the side flanges of the tote box. Removal of the box is then easily accomplished.

What is claimed is:

1. A tote box carrier comprising a framework, at least one pair of opposed spaced apart side rails, each a mirror image duplicate of the other, means connecting the pair of side rails to the framework, each side rail having a C-shaped cross-section and including upper and lower horizontally disposed surfaces with an outer portion interconnecting those surfaces, a tote box supported by the opposed side rails and having outwardly extending side flanges resting upon the lower surfaces of the side rails, a pair of generally aligned openings in the upper and lower surfaces of each side rail adjacent each end thereof, and a clip stop element associated with each pair of generally aligned openings, each clip stop element having a closed loop-shaped end extending through the opening in the lower surface of the side rail for attaching the element to the side rail and an open hook-shaped end releasably extending through the opening in the upper surface of the side rail in blocking relationship with the side flange of the tote box when removal prevention of the tote box is desired, each hook-shaped end being removable from the opening in the upper surface of the side rail whereby the clip stop element swings about its closed loop-shaped end to a non-blocking position out of contact with the side flange of the tote box when removal thereof is desired.

2. A tote box carrier as in claim 1 wherein the clip stop element is made from spring type wire.

3. A tote box carrier as in claim 1 wherein the closed loop-shaped end of the clip stop element has a rectangular configuration.

4. A tote box carrier as in claim 1 wherein the upper horizontally disposed surface portion of each side rail includes a notch adjacent each opening therein constructed and arranged to receive and accommodate the clip stop element when the open hook-shaped end thereof is extended through the opening in the upper surface of the side rail.

5. A tote box carrier as in claim 4 wherein each clip stop element is constructed and arranged to produce a snap fit between the open hook-shaped end thereof and the upper surface of the side rail.

* * * * *